United States Patent
Sun

(10) Patent No.: US 6,426,884 B1
(45) Date of Patent: Jul. 30, 2002

(54) REDUCING REVERSE CURRENTS IN A SYNCHRONOUS RECTIFIER CIRCUIT

(75) Inventor: Mark N. Sun, Plano, TX (US)

(73) Assignee: Ericsson, Inc., Richardson, TX (US)

( * ) Notice: Subject to any disclaimer, the term of this patent is extended or adjusted under 35 U.S.C. 154(b) by 0 days.

(21) Appl. No.: 09/707,030

(22) Filed: Nov. 6, 2000

(51) Int. Cl.[7] .............................................. H02M 3/335
(52) U.S. Cl. ......................... 363/17; 363/89; 363/127
(58) Field of Search ............................... 363/17, 81, 84, 363/89, 125, 127

(56) References Cited

U.S. PATENT DOCUMENTS

| | | | | |
|---|---|---|---|---|
| 4,953,068 A | * | 8/1990 | Henze | 363/17 |
| 6,069,802 A | * | 5/2000 | Priegnitz | 363/21.04 |
| 6,091,616 A | * | 7/2000 | Jacobs et al. | 363/127 |
| 6,130,828 A | * | 10/2000 | Rozman | 363/21.04 |
| 6,243,275 B1 | * | 6/2001 | Ferencz | 363/17 |
| 6,275,401 B1 | * | 8/2001 | Xia | 363/127 |

* cited by examiner

*Primary Examiner*—Adolf Deneke Berhane
(74) *Attorney, Agent, or Firm*—Arthur I. Navarro; Godwin Gruber, P.C.

(57) ABSTRACT

A converter with synchronous rectification is driven in such a way so that the reverse currents do not build up and cause damage to or limit the efficiency of the circuit. Negative currents are self-adjusted to a very small percentage of load current, so the converter will not have problems when in parallel with other modules. An auxiliary winding is used to allow an output inductor to drive the secondary side rectifiers thereby limiting their conduction time as reverse currents increase. The primary side conduction times are extended by operation of their anti-diodes so that reverse currents are limited naturally without the use of dedicated load sensing and shutdown circuits.

17 Claims, 6 Drawing Sheets

REDUCING REVERSE CURRENTS IN A SYNCHRONOUS RECTIFIER CIRCUIT

TECHNICAL FIELD

The present invention relates in general to distributed power systems and applications thereof and, more specifically, to a synchronous rectifier converter that limits the build up of reverse currents by self-adjustment to a very small percent of the load current so the converter will not have problems in parallel with other modules.

BACKGROUND OF THE INVENTION

As logic integrated circuits have migrated to lower working voltages in search for higher operating frequencies, and as overall system sizes have continued to decrease, power supply designs with smaller and higher efficiency power modules are in demand. In an effort to improve efficiencies and increase power densities, synchronous rectification has become necessary for these type of applications. Synchronous rectification has gained great popularity in the last ten years as low voltage semiconductor devices have advanced to make this a viable technology.

At the same time, the distributed power system has become popular and critical for both telecommunication and Internet networks. DC-to-DC (DC/DC) converters are a key part of the distributed power systems since they change the high amplitude DC bus voltage to the much lower DC voltage suitable for powering and driving logic level Integrated Circuits (ICs). The supply voltage for a new logic IC changes from 5.0V to lower voltages such as 3.3V, 2.5V, 1.8V, and 1.0V, for example, in order to increase the chip operation speed and density. Furthermore, very high-density board designs only reserve limited space for power supplies.

On the other hand, the IC chips demand much higher supply currents and the power loss of traditional diode rectifiers with high current is so large that thermal management becomes very difficult for power supplies. To meet this great challenge for power supplies, the power loss and heat need to be reduced greatly. The synchronous rectifiers can cut the power loss significantly and increase the power density very effectively because the power loss of MOSFETs is much lower than that of diodes, but the synchronous rectifiers require the proper drive circuit for the MOSFETs, increasing the complexity of synchronous rectifier circuits.

Accordingly, standard modules in parallel are often required to meet the demands of high output current applications. A main advantage is that synchronous rectifiers in parallel can have bi-directional power flow while the diode rectifier can only have power flow in one direction. Synchronous rectifier operation benefits from the two-direction MOSFET because the converter can always work in the continuous mode even at light load but converters may not work properly when modules are in parallel with other modules.

A major limitation of the use of synchronous rectifiers for distributed power systems is that the reverse current to the synchronous rectifiers can render them highly inefficient or damage them entirely. In particular, in reverse power-flow conditions, a large circulating current between modules can develop placing high voltage stresses on the MOSFET, which may damage the converters. Therefore, reverse current must be avoided in order to parallel the synchronous rectifiers.

A prior art method of limiting the effects of reverse currents in a synchronous rectifier arrangement involves the use of a sensing circuit to turn OFF the MOSFET once a reverse current is detected. This approach is illustrated in FIG. 1, which shows the full-bridge DC/DC converter with synchronous rectification. The load current is sensed and used to control the secondary driver. The synchronous MOSFET is turned off when the negative current is detected. This approach, however, requires the use of a load current sensing circuit which adds complexity and cost to the system and requires shutdown of the synchronous rectifier circuit for some time. The operation mode of such a converter is therefore discontinuous at light load levels with the converter oscillating between a continuous mode and a discontinuous mode.

Accordingly, a synchronous rectifier circuit that limits the effects of reverse current with minimal parts and less complexity would be advantageous.

SUMMARY OF THE INVENTION

The present invention provides a unique and novel approach to preventing the effects of reverse current in a synchronous rectifier system. With the present invention, the synchronous rectifier circuit has a reduced part count and reduced complexity. Furthermore, the synchronous rectifier of the present invention can apply to both isolated and non-isolated power converters.

Accordingly, disclosed in one embodiment is a synchronous rectifier circuit that is driven in such a way so that the reverse current does not build up and cause damage or limit the efficiency of the circuit. Essentially, the negative current is self-adjusted to a very small percent of load current, so the converter will not have problems in parallel with other modules.

A technical advantage of the invention is that the reverse current is prevented in a natural way so that the negative load current sensing circuit and shutdown circuits are not needed.

BRIEF DESCRIPTION OF THE DRAWINGS

The above features of the present invention will be more clearly understood from consideration of the following descriptions in connection with the accompanying drawings in which.

Corresponding numerals and symbols in the different figures refer to corresponding parts unless otherwise indicated.

DETAILED DESCRIPTION OF THE PREFERRED EMBODIMENTS

The following is a detailed description of the present invention. A prior art circuit will be discussed first, followed by a description of several preferred embodiments and alternatives of the present invention, as well as a discussion of the advantages.

Figure 1:
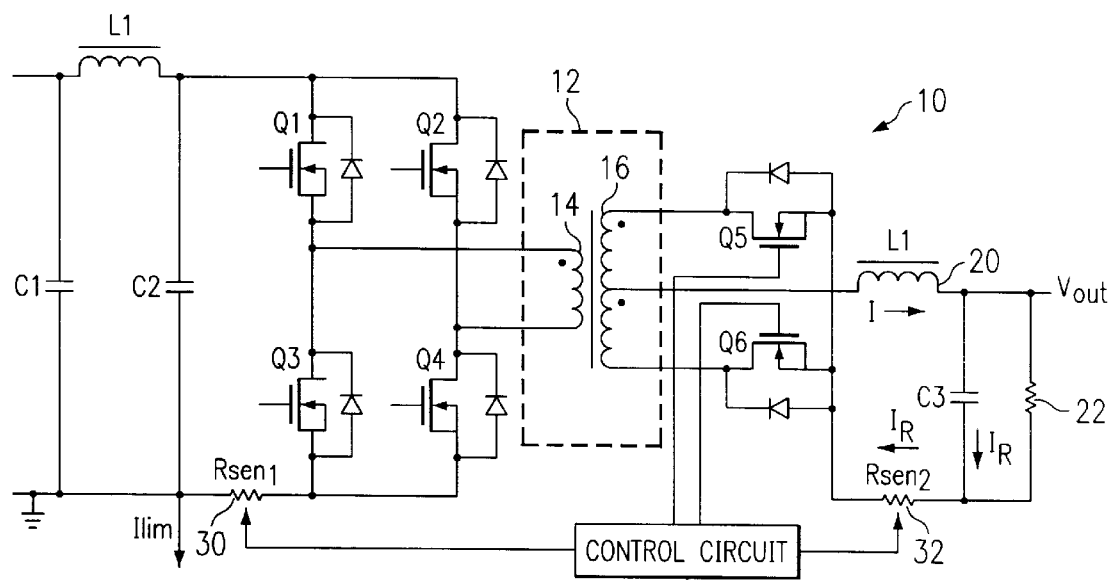
FIG. 1 is a circuit diagram illustrating a prior art full-bridge converter with externally driven synchronous rectification.

FIG. 1 shows a prior art externally-driven full-bridge synchronous rectifier converter circuit, referred to generally as 10. In particular, the synchronous rectifier circuit 10 includes a primary side synchronous rectifier scheme comprised of four synchronous rectifiers Q1, Q2, Q3, and Q4 which, as shown, are operably coupled to primary winding 14 of transformer 12. The primary winding 14 of the transformer 12 is inductively coupled to a secondary winding 16 permitting the DC-to-DC conversion function as is well known in the art. In operation, signals from the primary winding 14 of the transformer 12 are induced into the secondary winding 16 which, as shown, is center-tapped to drive the output inductor 20. The output capacitor 24, and a load resistor 22 comprise an output stage of the converter 10 which receives the output voltage (Vout).

Figure 2:
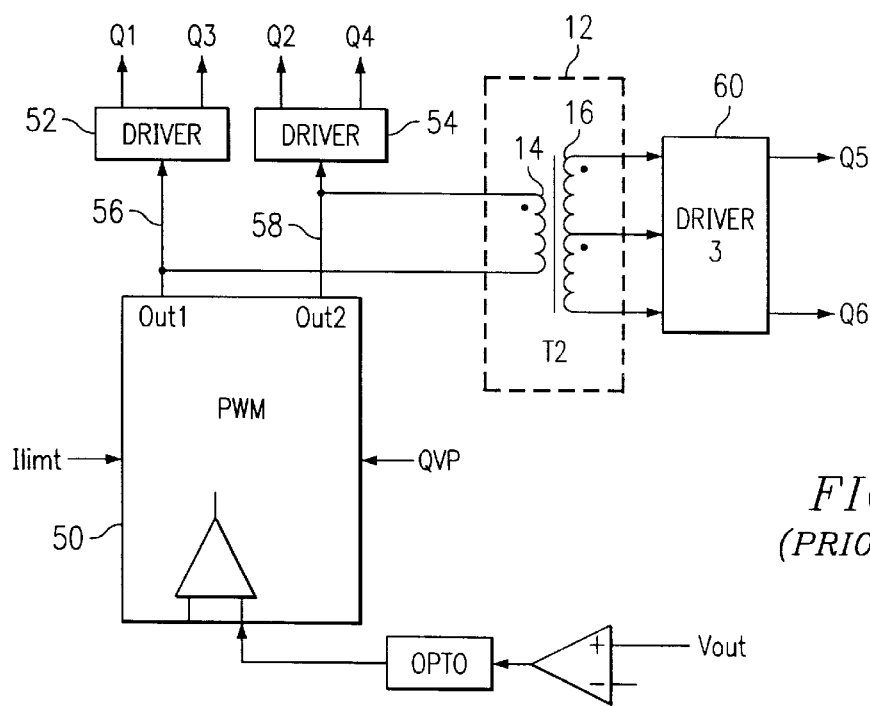
FIG. 2 is a circuit diagram showing a control circuit for use with a converter, such as the converter of FIG. 1.

Typically, an external drive circuit of the type shown in FIG. 2 is used to drive the synchronous rectifiers Q1, Q2, Q3, and Q4 and to provide the necessary timing signals that turn-ON and turn-OFF the synchronous rectifiers Q1, Q2, Q3, and Q4. A Pulse Wave Modulated (PWM) circuit 50 is seen coupled to drivers 52, 54 which, in turn, drive synchronous rectifiers Q1, Q2, Q3, and Q4. The timing signals 56, 58 are likewise coupled to the primary winding 14 of the transformer 12 which in turn drives the secondary side driver circuit 60. In this way, the driver circuit 60 operates the secondary side synchronous rectifier scheme comprised of synchronous rectifier MOSFETs Q5 and Q6 which, as explained below, are used for limiting the damage of any reverse currents $I_R$ that could harm the circuit 10.

Referring to FIG. 1, the sense resistors 30 and 32 provide a load sensing circuit which senses the negative load current or reverse current $I_R$ into the secondary side of the circuit 10 in order to turn-OFF operate Q5 and Q6 without damage to the circuit 10. Thus, in this way, Q5 and Q6 can be turned OFF when a negative current is detected so that the circuit 10 is not damaged. The shutdown control circuit 40 provides a mechanism that produces the necessary timing signals to turn OFF Q5 and Q6.

While the use of synchronous rectifiers Q1, Q2, Q3, Q4, Q5, and Q6 is advantageous for many modern day distributed power applications, the presence of a load sensing circuit, such as provided by the load resistors 30, 32, and a shutdown circuit, such as shutdown control circuit 40, to avoid damage to the circuit 10 is not advantageous. Therefore, the configuration of FIG. 1 is undesirable for several reasons. First, the operation of the converter circuit 10 may be discontinuous at light loads and may cause oscillations between a continuous mode and a discontinuous mode. Second, the use of load sensing and shutdown circuits adds complexity and cost to the overall converter circuit 10. Accordingly, the present invention provides a synchronous rectifier circuit without these disadvantages and that avoids the use of load sensing and shutdown circuits.

Figure 3:
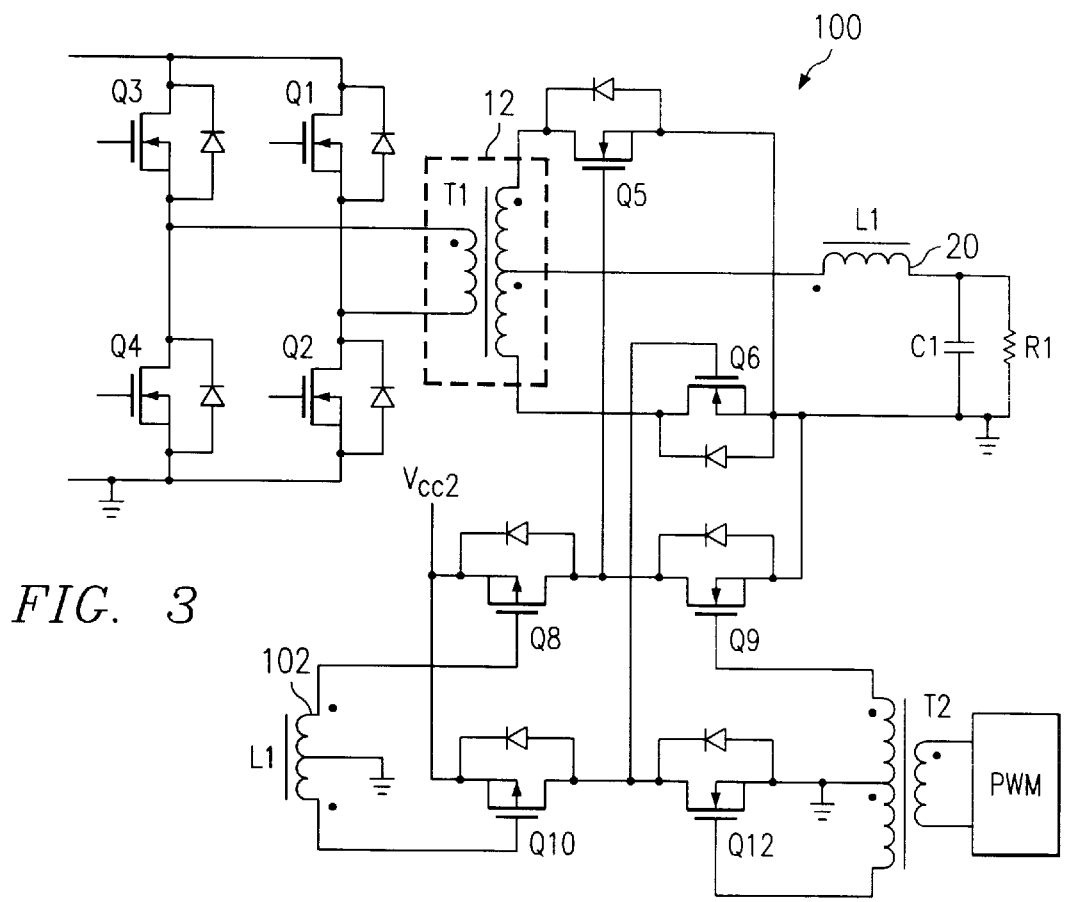
FIG. 3 is a circuit diagram of a full-bridge DC-to-DC converter with a synchronous rectifier according to one embodiment of the invention.

With reference to FIG. 3, therein is shown a circuit diagram of a full-bridge converter with synchronous rectification, denoted generally as 100, according to the invention. Essentially, the converter 100 has an auxiliary winding 102 added to the output inductor 20 so that synchronous rectifiers (MOSFETS Q5 and Q6) on the secondary side of the transformer 12 are driven by the output inductor 20. The fact that the output inductor 20 drives the rectifiers (MOSFETS Q5 and Q6) eliminates the need for separate load sensing and shutdown circuits.

Figure 4:
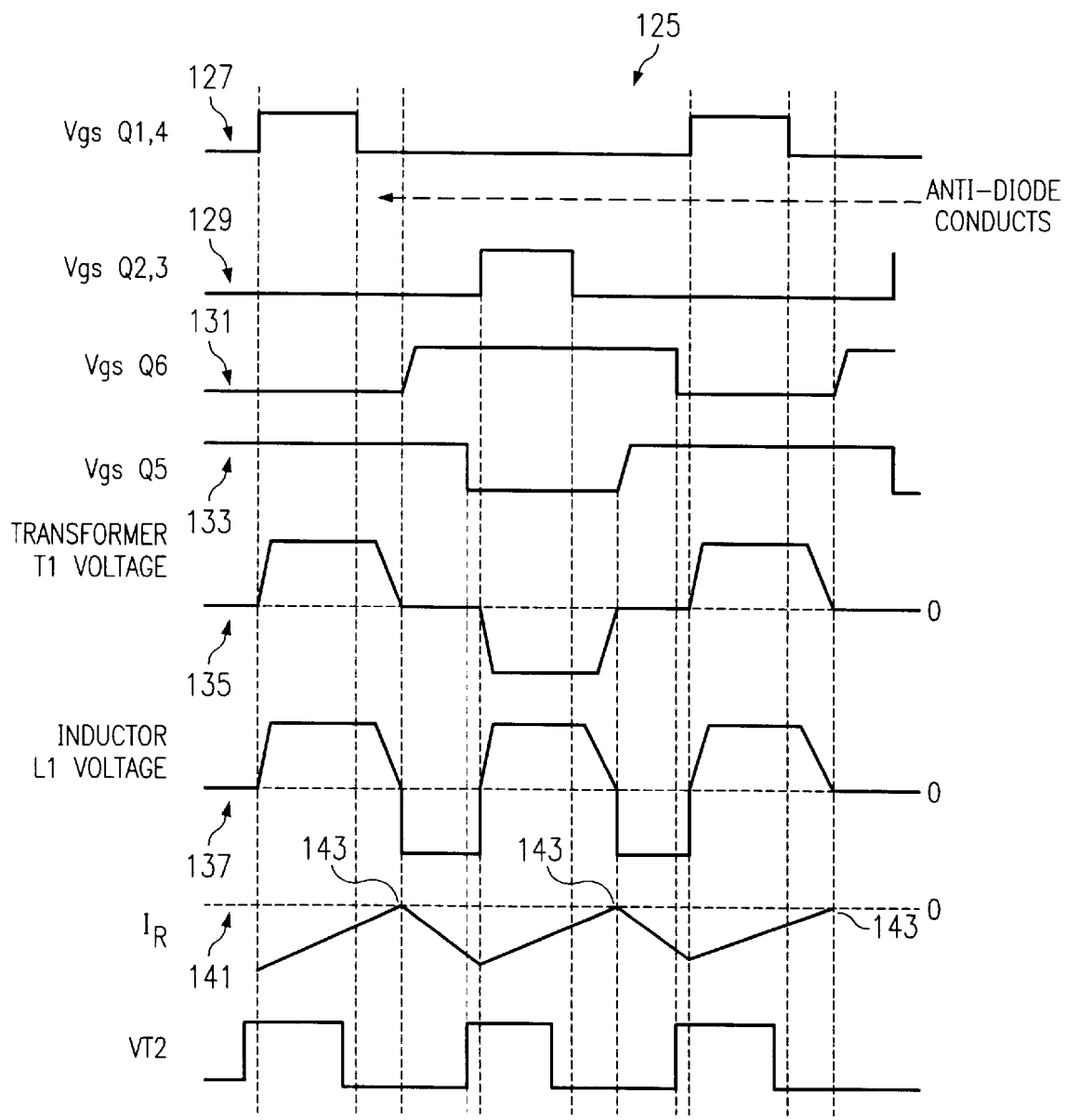
FIG. 4 is a timing diagram illustrating the operational waveforms of the converter of FIG. 3.

The operation of the synchronous rectifier 100 is better understood by reference to FIG. 4, which is a signal timing diagram, denoted as 125, of the circuit's operational waveforms. Signals 127 and 129 show that the anti-diode of primary side MOSFETs Q1, Q2, Q3, Q4 will conduct to carry the reverse current $I_R$, so that the voltage (Signal 135) over the transformer 12 will not vanish even through their gate drive voltage (Q1–Q4) does not exist. The voltage (Signal 137) of the output inductor 20 will maintain the amplitude of the transformer 12 (Signal 135) until the reverse current $I_R$ (Signal 141) through the inductor 20 gradually goes back to zero. This is indicated by Points 143 of the reverse current Signal 141.

Referring to FIGS. 3 and 4, the secondary side MOSFETs Q5 and Q6 will have the shorter conduction time as the load current becomes negative ($I_R$). The self-extended conduction time of the primary side synchronous rectifiers Q1, Q2, Q3 and Q4 coupled with the shortened conduction time of the secondary side rectifiers Q5 and Q6 give the converter 100 enough time so the reverse current $I_R$ (Signal 141) reaches a peak of zero (Points 143).

The fact that the reverse current $I_R$ (Signal 141) reaches a relatively small negative value and peaks at zero assures that the reverse current $I_R$ (Signal 141) will never build up and will be limited to the average value of inductor ripple current. Furthermore, since the reverse current $I_R$ (Signal 141) is so small, no abnormal operation such as a large voltage spike or a high cross-conduction-loss is found in the circuit 100. The operation of synchronous rectifiers Q1, Q2, Q3, and Q4 is always in continuous mode, so the stability of the circuit 100 is good even at light loads. Thus, by using the auxiliary winding 102 to drive the secondary side MOSFETs Q5, Q6, control of the reverse current $I_R$ is achieved and the circuit 100 is spared any damage. Also, the magnitude of the reverse current $I_R$ is controlled in a natural way since it eliminates the need for either a load sensing or a shutdown circuit.

Figure 5:
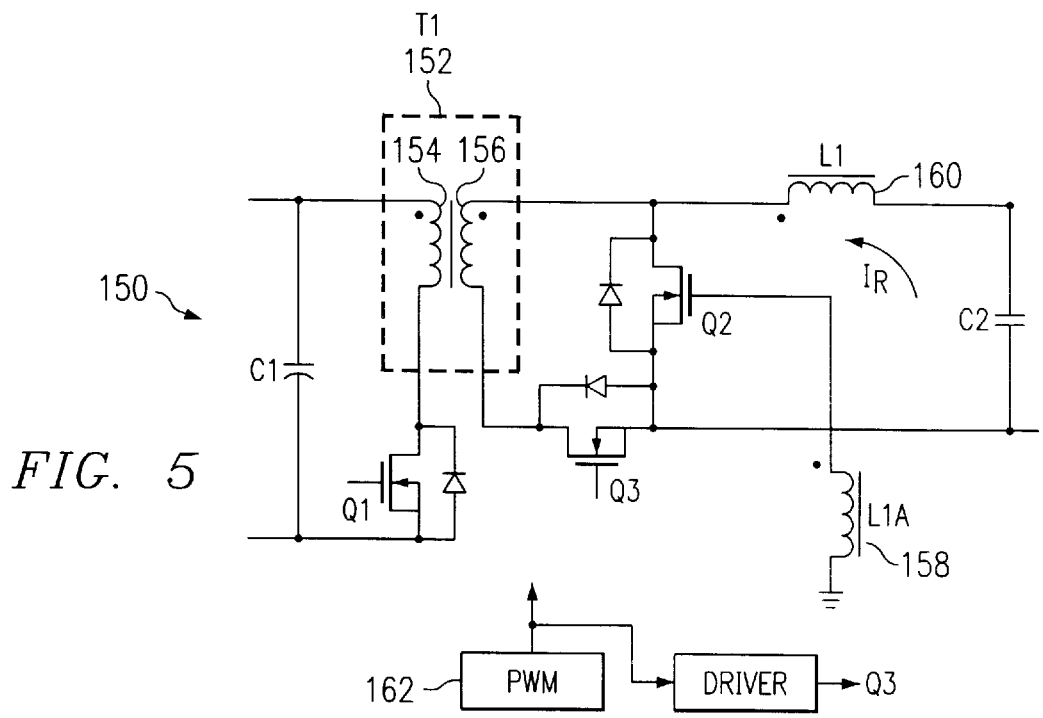
FIG. 5 is a circuit diagram of a forward converter with synchronous rectification according to another embodiment of the invention.

FIG. 5 is a circuit diagram of a forward converter with synchronous rectification, denoted generally as 150. As with the full-bridge synchronous DC/DC rectifier 100, the forward converter 150 includes a transformer 152 with primary 154 and secondary 156 windings, but only one primary side rectifier Q1 conducts in a half-cycle. The auxiliary winding 158 has been added to operate the secondary side MOSFET Q2 and is arranged so that the auxiliary winding 158 restricts the reverse current $I_R$ to a maximum value that is within the ripple current of the inductor 160.

Figure 6:
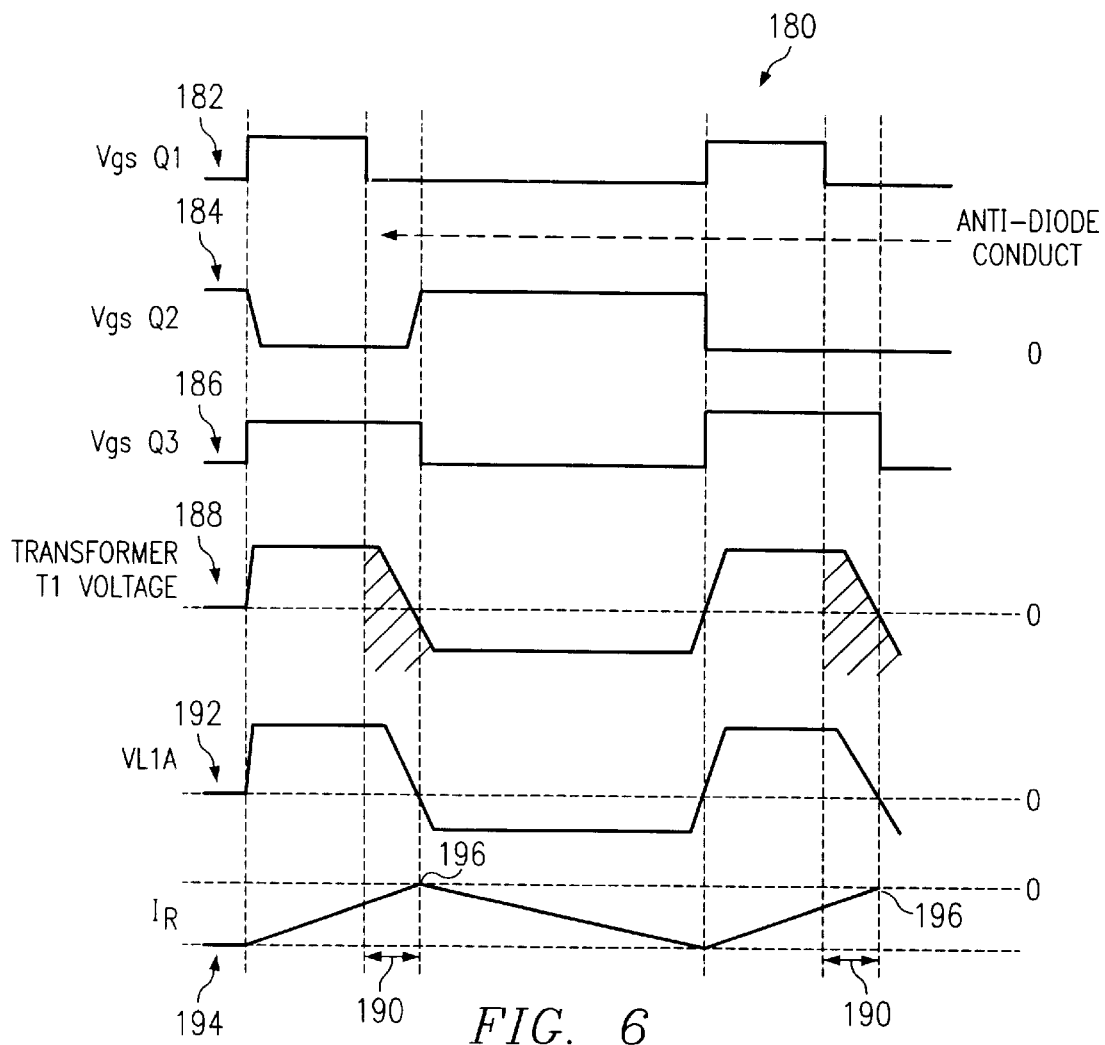
FIG. 6 is a timing diagram illustrating the operational waveforms of the converter of FIG. 5.

FIG. 6 is a timing diagram, denoted as 180, showing the operational waveforms of the forward converter 150. The MOSFETs Q2 and Q3 are driven by PWM pulse generator circuit 162 as indicated by signals 184 and 186. The freewheel MOSFET Q2 gate is shunted by inductor winding 158. The anti-diode of primary MOSFET Q1 conducts when the load current is negative (when reverse current $I_R$ has some value less than zero) as shown by signal 182 with the voltage of the transformer 152 (Signal 188) extending (regions 190) the conduction even as the PWM pulse disappears. The gate drive signal causes Q2 to extend the its conduction time. Therefore, the reverse current $I_R$ through the inductor 152 goes back to the zero (Signal 194 and Points 196) and the reverse current $I_R$ is self-limited to a very small percentage of load current.

Figure 7:
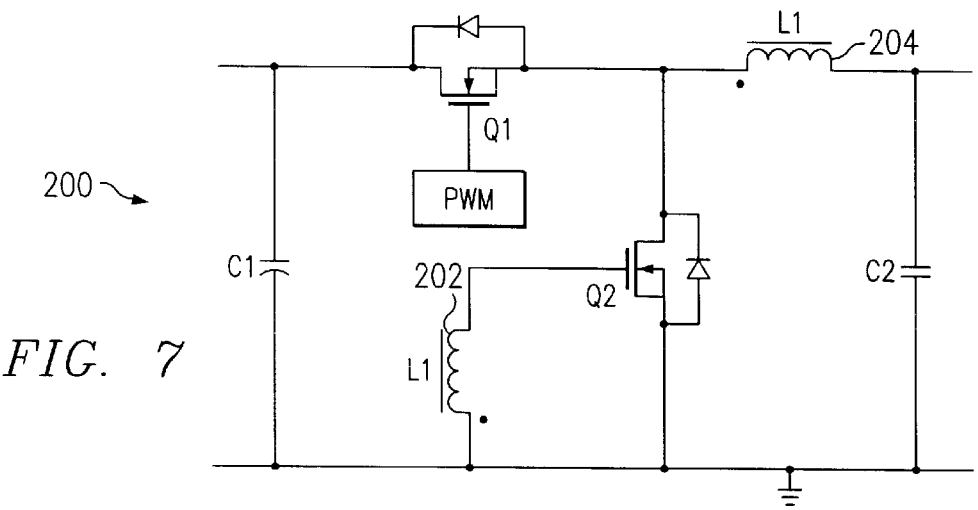
FIG. 7 is a circuit diagram of a buck-type converter with synchronous rectification according to still another embodiment of the invention.
Figure 8:
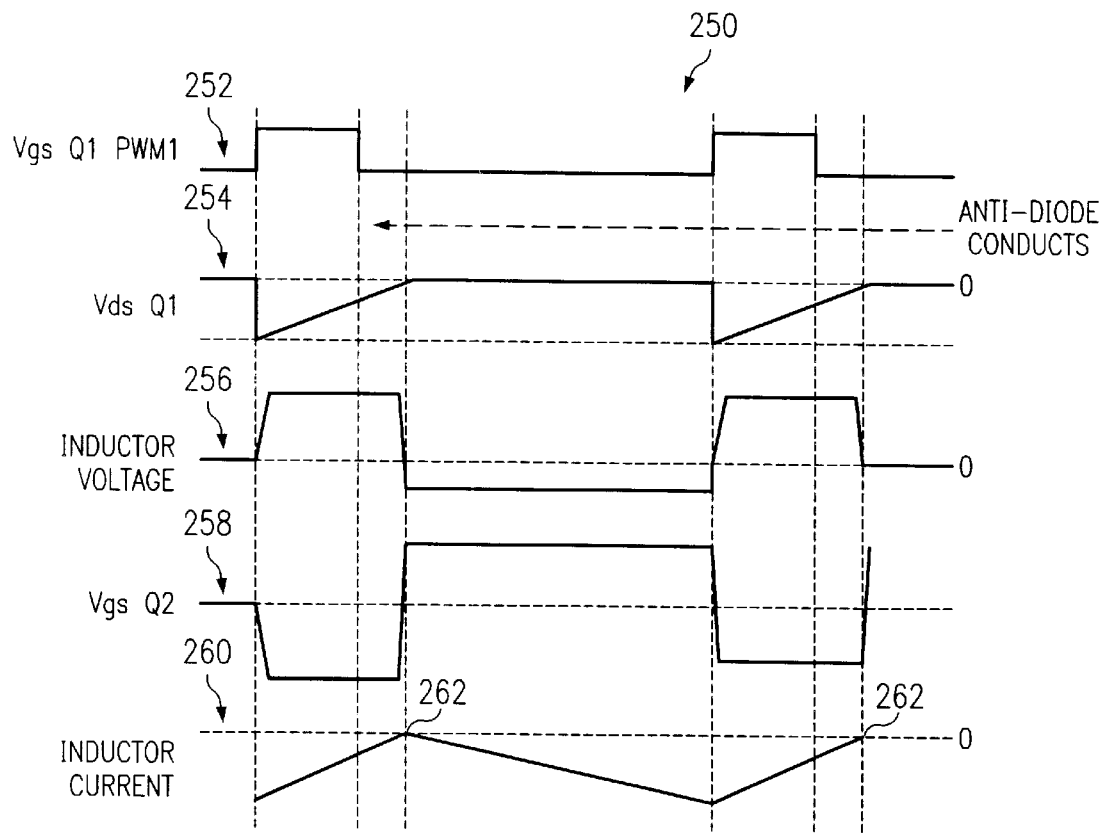
FIG. 8 is a timing diagram illustrating the operational waveforms of the converter of FIG. 7.

The non-isolated buck converter with synchronous rectification is shown and denoted generally as 200 in FIG. 7 (only the secondary side of the converter is shown in FIG. 6). The auxiliary winding 202 drives the MOSFET Q2 as shown in the timing diagram, denoted as 250, of FIG. 8. The anti-diode of Q1 conducts when load current is negative. The voltage (Signal 256) remains positive until the anti-diode current drops to zero. Q2 gate voltage (Signal 258) is in phase with inductor voltage (Signal 256). The inductor current (Signal 260) ramps up from the negative peak to zero (Points 262) since the voltage "ON" time for Q2 and the inductor 204 is extended. The reverse current (Signal 260) does not build up and is limited to the average value of inductor ripple current.

Figure 9:
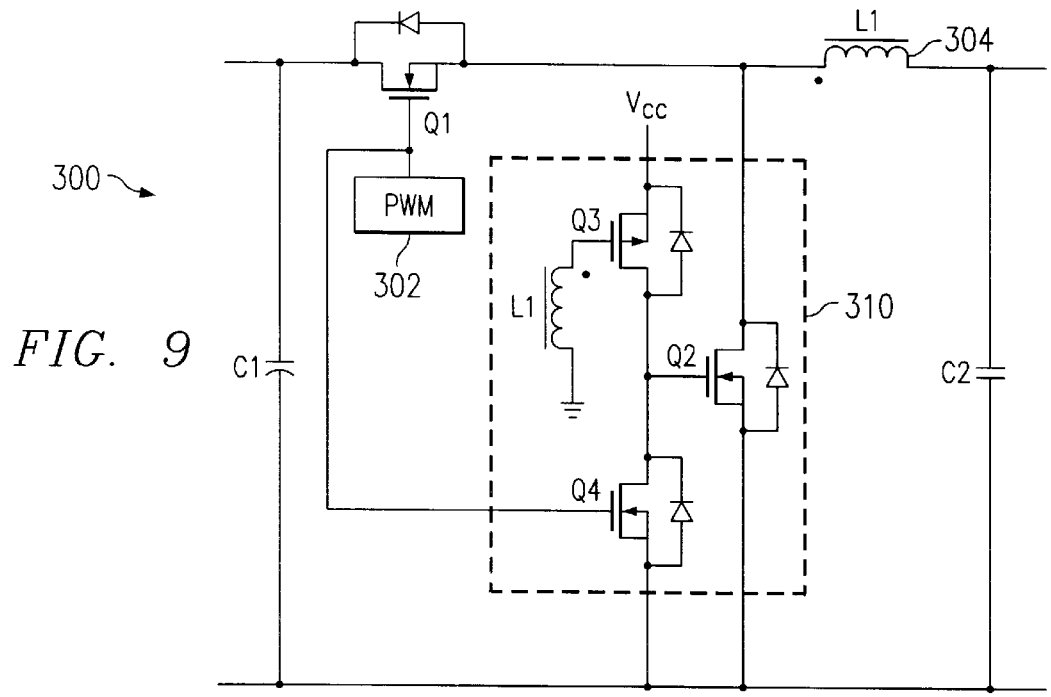
FIG. 9 is a circuit diagram of a buck-type converter with an alternate synchronous drive scheme according to still another embodiment of the invention.
Figure 10:
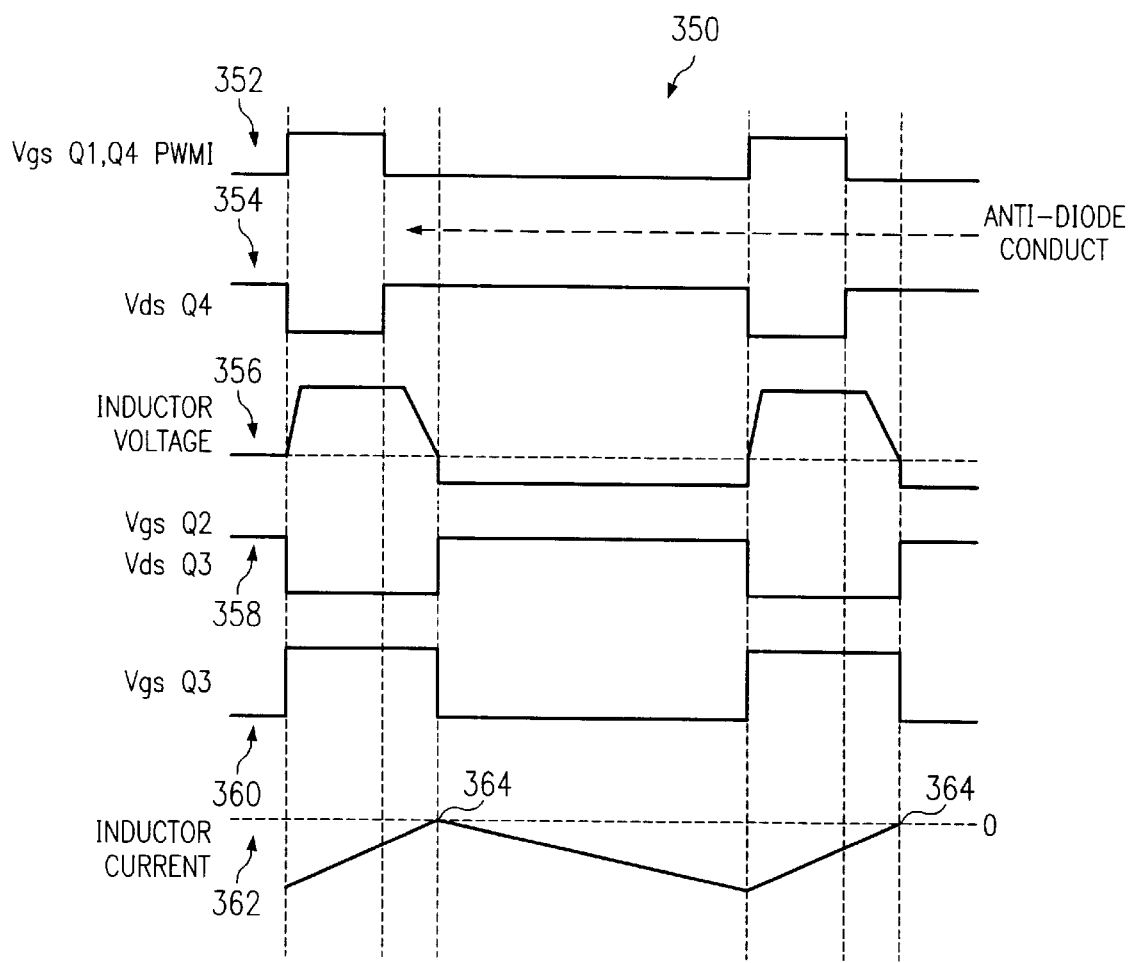
FIG. 10 is a timing diagram illustrating the operational waveforms of the converter of FIG. 9.

FIG. 9 shows the synchronous buck converter, 300, with different drive scheme 310. FIG. 10 shows a timing diagram for the converter 300. The high side MOSFET Q1 is driven directly from PWM pulse generator circuit 302 and the freewheel MOSFET Q2 is driven by inductor winding 304, Q3 and Q4. The MOSFET Q2 is turned on by the voltage (Signal 356) of the inductor 304 and turned off by PWM pulse (Signal 352).

In summary, when the modules are in parallel and the voltage of one module is higher than the other, the module with the highest output voltage tries to force the current flow into other modules. The synchronous rectifiers of converters 100, 150, 200, 300 will normally work as they operate in discontinuous mode. The reverse current $I_R$ of each converter will be limited to the average value of inductor ripple current. This invention can be easily applied to all types of topologies, including bridge-type converters, push-pull converters, forward converters and buck converters.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. For example, while the synchronous rectifiers Q1, Q2, Q3 and Q4 are shown and described as MOSFETS, it is contemplated that another type of FET or switching device would be suitable for use in the present invention. It is therefore intended that the appended claims encompass any such modifications or embodiments.

What is claimed is:

1. A DC-to-DC converter comprising:
   a transformer having inductively coupled primary and secondary windings;
   a primary full bridge inverter coupled to said primary winding;
   a secondary synchronous rectifier coupled to said secondary winding;
   an output stage coupled to said secondary synchronous rectifier; and
   a self-limiting reverse current scheme for controlling the magnitude of the reverse current flowing from said output stage to said secondary synchronous rectifier.

2. The converter of claim 1 wherein said primary side synchronous rectifier scheme is configured as a full bridge converter.

3. The converter of claim 1 wherein said primary side synchronous rectifier scheme is configured as a forward converter.

4. The converter of claim 1 wherein said primary side synchronous rectifier scheme is configured as a buck-type converter.

5. The converter of claim 1 wherein said output stage comprises an output inductor winding for driving a load resistance.

6. The converter of claim 5 wherein said self-limiting reverse current scheme comprises an auxiliary winding inductively coupled to said output inductor.

7. The converter of claim 6 wherein said auxiliary winding is further arranged to directly drive said secondary side synchronous rectifier scheme.

8. The converter of claim 1 further comprising a pulse wave modulated generator circuit for driving both said secondary side synchronous rectifier scheme and said self-limiting reverse current scheme.

9. The converter of claim 1 wherein said primary side synchronous rectifier scheme comprises four MOSFET synchronous rectifiers configured to provide full-bridge rectification.

10. The converter of claim 1 wherein said secondary side synchronous rectifier scheme comprises two MOSFET synchronous rectifiers configured for driving said output stage.

11. A full bridge synchronous rectifier comprising:
    a transformer with primary and secondary windings;
    full bridge inverters coupled to said primary winding;
    secondary synchronous rectifiers coupled to said secondary winding;
    an output inductor arranged to be driven by signals from said secondary winding;
    an output stage coupled to said output inductor opposite said secondary winding; and
    an auxiliary winding inductively coupled to said output inductor and arranged for limiting the magnitude of reverse currents through said output inductor.

12. The synchronous rectifier of claim 11 further comprising a pulse wave modulator circuit for driving said secondary side synchronous rectifiers.

13. The synchronous rectifier of claim 12 wherein said pulse wave modulator circuit is further arranged for driving said auxiliary winding.

14. The synchronous rectifier of claim 11 wherein during operation the output inductor maintains the same voltage as the secondary winding until reverse currents return to zero.

15. The synchronous rectifier of claim 11 wherein during operation the output the secondary side rectifiers are arranged to have shorter conduction times as the current through said output inductor becomes increasingly negative.

16. The synchronous rectifier of claim 11 wherein said primary side synchronous rectifiers comprise four MOSFETS.

17. The synchronous rectifier of claim 11 wherein said secondary side synchronous rectifiers comprise two MOSFETS.

* * * * *

UNITED STATES PATENT AND TRADEMARK OFFICE
CERTIFICATE OF CORRECTION

PATENT NO.    : 6,426,884 B1
DATED         : July 30, 2002
INVENTOR(S)   : Mark N. Sun It is certified that error appears in the above-identified patent and that said Letters Patent is hereby corrected as shown below:

Column 6,
Line 1, should read -- 2. The converter of claim 1 wherein said primary "side synchronous rectifier scheme" full bridge inverter is configured as a full bridge converter. --
Line 4, should read -- 3. The converter of claim 1 wherein said primary "side synchronous rectifier scheme" full bridge inverter is configured as a forward converter. --
Line 7, should read -- 4. The converter of claim 1, wherein said primary "side synchronous rectifier scheme" full bridge inverter is configured as a buck-type converter. --

Signed and Sealed this

Second Day of August, 2005

JON W. DUDAS
*Director of the United States Patent and Trademark Office*